United States Patent
Kim

(10) Patent No.: US 7,574,188 B2
(45) Date of Patent: Aug. 11, 2009

(54) APPARATUS AND METHOD FOR REMOVING JAMMER SIGNAL IN WIRELESS COMMUNICATION RECEIVER

(75) Inventor: Hyun-Seok Kim, Gwacheon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 425 days.

(21) Appl. No.: 11/567,825

(22) Filed: Dec. 7, 2006

(65) Prior Publication Data

US 2007/0238435 A1 Oct. 11, 2007

(30) Foreign Application Priority Data

Feb. 6, 2006 (KR) .................. 10-2006-0011173

(51) Int. Cl.
*H04B 1/10* (2006.01)
(52) U.S. Cl. .............. 455/296; 455/403; 455/414.1; 455/226.1
(58) Field of Classification Search ......... 455/296, 455/226.1, 227.1, 269, 260, 323, 333, 334, 455/414.1, 403, 560.1
See application file for complete search history.

(56) References Cited

U.S. PATENT DOCUMENTS

2004/0203458 A1 10/2004 Nigra

FOREIGN PATENT DOCUMENTS

EP 1033851 A2 9/2000
KR 1999-0082655 11/1999

*Primary Examiner*—Tony T Nguyen
(74) *Attorney, Agent, or Firm*—F. Chau & Assoc., LLC

(57) ABSTRACT

An apparatus and method for removing a jammer signal in a wireless communication receiver, in which a frequency converter down-converts a radio frequency (RF) signal including a desired and a jammer signal into a baseband signal. A first filter removes the desired signal from an output signal of the frequency converter and outputs a jammer signal as an output signal. The frequency converter up-converts the jammers signal output from the first filter. The second filter outputs the up-converted jammer signal as an output signal. The first adder receives the RF signal and the output signal of the second filter and removes the jammer signal from the RF signal using the RF signal and the output signal of the second filter. Accordingly, the frequency converter down-converts the RF signal including the attended jammer signal.

12 Claims, 10 Drawing Sheets

APPARATUS AND METHOD FOR REMOVING JAMMER SIGNAL IN WIRELESS COMMUNICATION RECEIVER

CROSS-REFERENCE TO RELATED PATENT APPLICATION

This application claims priority under 35 U.S.C. § 119 from Korean Patent Application No. 10-2006-0011173, filed on Feb. 6, 2006, the disclosure of which is hereby incorporated by reference herein as if set forth in its entirety.

BACKGROUND OF THE INVENTION

1. Technical Field

The present disclosure relates to a wireless communication apparatus, and more particularly, to an apparatus and method for removing an interferer signal in a wireless communication apparatus.

2. Discussion of the Related Art

Because many wireless communication service providers use a limited wireless frequency spectrum, interference between wireless communication system has been increasing. For example, when different wireless communication systems use adjacent regions in the wireless frequency spectrum, interference may often occur.

FIG. 1 is a functional block diagram of a conventional wireless communication receiver 10. Referring to FIG. 1, the wireless communication receiver 10 includes an antenna 11, a duplexer 13, a low noise amplifier (LNA) 15, a surface acoustic wave (SAW) filter 17, a down-conversion mixer (or a down frequency converter) 19 that also receives a local oscillator signal $f_{LO}$, and a low pass filter (LPF) 21.

This LNA 15 amplifies a radio frequency (RF) signal input through the antenna 11 and the duplexer 13. The SAW filter 17 filters the RF signal output from the LNA 15 to pass only an in-band signal and outputs a filtered RF signal X1 to the down-conversion mixer 19. The RF signal includes a desired signal and an undesired signal, that is, an interferer signal also called a jammer signal.

The down-conversion mixer 19 converts the output signal of the SAW filter 17, that is, the filtered RF signal X1 into a baseband signal X2 using the local oscillator signal $f_{LO}$. The LPF 21 filters the baseband signal X2 output from the down-conversion mixer 19 to pass only a channel signal X0, that is, the desired signal WS shown FIG. 2A and outputs the channel signal X0 to a modem (not shown).

Referring to FIGS. 1 through 2C, the interferer signal, hereinafter, referred to as a "jammer signal", included in the output signal X1 to the down-conversion mixer 19 is transferred as it is to the output signal X2 of the down conversion mixer 19. Accordingly, the LPF 21 is designed to have a bandwidth for removing the jammer signal included in the baseband signal X2, as illustrated in FIG. 2C. Most of the jammer signal is removed by the LPF 21 and only some jammer leakage is included in the filter output X0.

Generally, wireless communication receivers receive an RF signal including a desired signal and an undesired signal, that is, a jammer signal. The jammer signal interferes with the reception of the desired signal. In code division multiple access (CDMA) wireless communication receivers, the phase noise and linearity of a voltage controlled oscillator is substantially determined according to the magnitude of a jammer signal and not that of a desired signal, that is, a CDMA signal.

In other words, design specifications of elements of a receiver, such as the LNA 15, the down-conversion mixer 19, and LPF 21, become very complicated because of the jammer signal. As a result, designing the elements of a receiver is difficult and is expensive.

SUMMARY OF THE INVENTION

Exemplary embodiments of the present invention provide an apparatus and method for removing a jammer signal in a wireless communication apparatus.

According to an exemplary embodiment of the present invention, there is provided a frequency converter including a first transconductance amplifier, a second transconductance amplifier, a third transconductance amplifier, a fourth transconductance amplifier, a first mixer, a first signal splitting unit, a second mixer, and a second signal splitting unit. The first transconductance amplifier outputs second differential output current signals corresponding to a voltage difference between radio differential input voltage signals to a pair of first output terminals. The second transconductance amplifier outputs first differential output current signals corresponding to the voltage difference between the radio differential input voltage signals to a pair of second output terminals. The third transconductance amplifier outputs third differential output current signals corresponding to a voltage difference between in-phase baseband differential input voltage signals to the pair of first output terminals. The fourth transconductance amplifier outputs fourth differential output current signals corresponding to a voltage difference between quadrature-phase baseband differential input voltage signals to the pair of second output terminals. The first mixer down-converts the first differential output current signals in response to in-phase differential local oscillation signals and outputs down-converted first differential signals to a pair of third output terminals, and simultaneously up-converts the third differential output current signals in response to the in-phase differential local oscillation signals and outputs up-converted second differential signals to the pair of third output terminals. The first signal splitting unit splits a signal output via the pair of third output terminals into first differential signals and second differential signals, outputs the first differential signals via a pair of fourth output terminals, and outputs the second differential signals via a pair of fifth output terminals. The second mixer down-converts the second differential output current signals in response to quadrature-phase differential local oscillation signals and outputs down-converted third differential signals to a pair of sixth output terminals, and simultaneously up-converts the fourth differential output current signals in response to the quadrature-phase differential local oscillation signals and outputs up-converted fourth differential signals to the pair of sixth output terminals. The second signal splitting unit splits a signal output via the pair of sixth output terminals into third differential signals and fourth differential signals, outputs the third differential signals via a pair of seventh output terminals, and outputs the fourth differential signals via the pair of fifth output terminals.

According to an exemplary embodiment of the present invention, there is provided an apparatus for removing a jammer signal in a wireless communication receiver. The apparatus includes a first adder having a first input terminal for receiving a radio frequency signal including a first signal and a jammer signal and a second input terminal; a second adder having a first input terminal for receiving a radio frequency signal output from the first adder and having a second input terminal; a frequency converter down-converting a radio frequency signal included in a second signal output from the second adder and up-converting a baseband signal included in a second signal using a local oscillator signal; a first filter connected between an output terminal of the frequency converter and the second input terminal of the first adder to remove the first signal; and a second filter connected between the output terminal of the frequency converter and the second input terminal of the second adder to remove the first signal.

A cutoff frequency of the first filter may lower than a cutoff frequency of the second filter. Each of the first and second filters may be a high pass filter or a band pass filter.

According to an exemplary embodiment of the present invention, there is provided a wireless communication receiver including an antenna receiving a radio frequency signal including a first signal and a jammer signal; a first adder having a first input terminal for receiving the radio frequency signal and having a second input terminal; a second adder having a first input terminal for receiving a radio frequency signal output from the first adder and having a second input terminal; a frequency converter down-converting a radio frequency signal included in a second signal output from the second adder and up-converting a baseband signal included in a second signal using a local oscillator signal; a first filter connected between an output terminal of the frequency converter and the second input terminal of the first adder to output a jammer signal that has been down-converted by the frequency converter as a first filter signal; and a second filter connected between the output terminal of the frequency converter and the second input terminal of the second adder to output a jammer signal that has been up-converted by the frequency converter as a second filter signal.

According to an exemplary embodiment of the present invention, there is provided a method of removing a jammer signal in a wireless communication receiver. The method includes down-converting a first signal and a jammer signal, which are included in a radio frequency signal, using a frequency converter; outputting the jammer signal as a first filter signal using a first filter; up-converting the first filter signal output from the first filter using the frequency converter; outputting the up-converted jammer signal as a second filter signal using a second filter having a higher cutoff frequency than the first filter; and receiving the radio frequency signal and the second filter signal and removing the jammer signal using the radio frequency signal and the second filter signal.

BRIEF DESCRIPTION OF THE DRAWINGS

Exemplary embodiments of the present invention will be understood in more detail from the following descriptions taken in conjunction with the attached drawings in which.

DETAILED DESCRIPTION OF EXEMPLARY EMBODIMENTS

Figure 1:
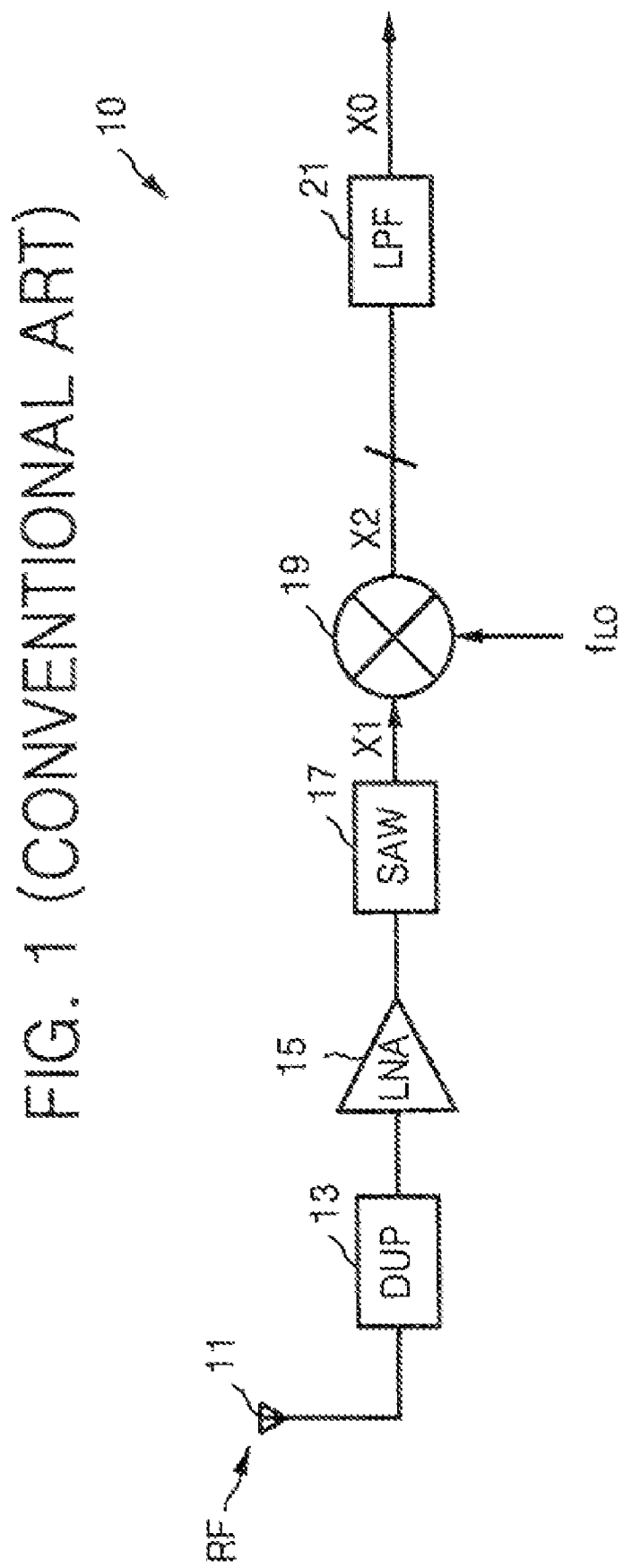
FIG. 1 is a functional block diagram of a conventional wireless communication receiver.
Figure 2A:
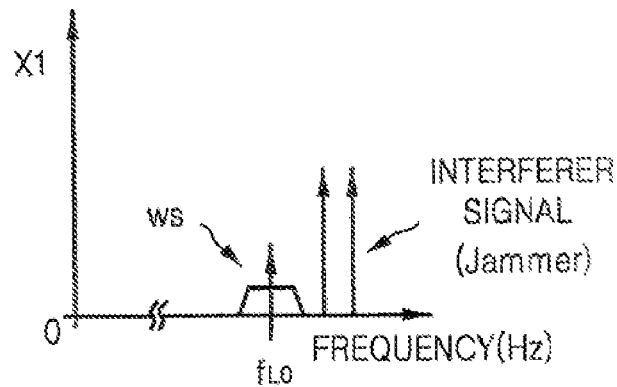
FIG. 2A illustrates the waveform of an input signal of a mixer used in the receiver of FIG. 1.
Figure 2B:
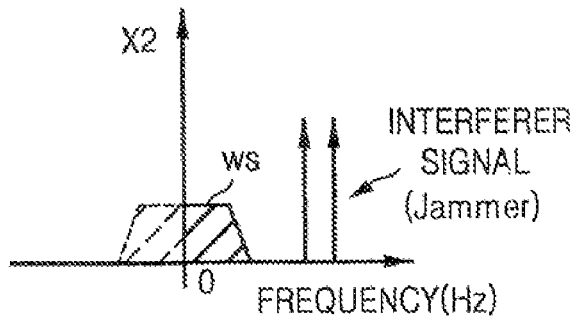
FIG. 2B illustrates the waveform of an output signal of the mixer used in the receiver of FIG. 1.
Figure 2C:
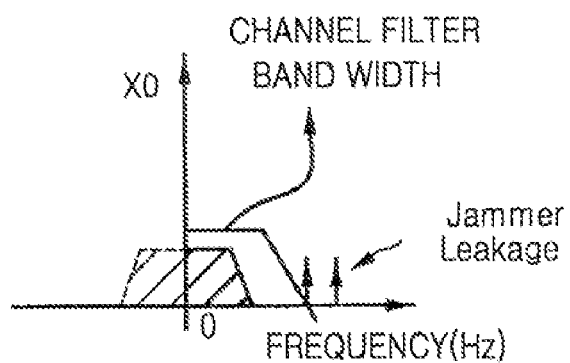
FIG. 2C illustrates the waveform of an output signal of a filter used in the receiver of FIG. 1.

The attached drawings for illustrating exemplary embodiments of the present invention are referred to in order to gain a sufficient understanding of the present invention, the merits thereof, and the objectives accomplished by the implementation of the exemplary embodiments of the present invention. Hereinafter, the present invention will be described in detail by explaining exemplary embodiments with reference to the attached drawings. Like reference numerals in the drawings denote like elements.

Figure 3:
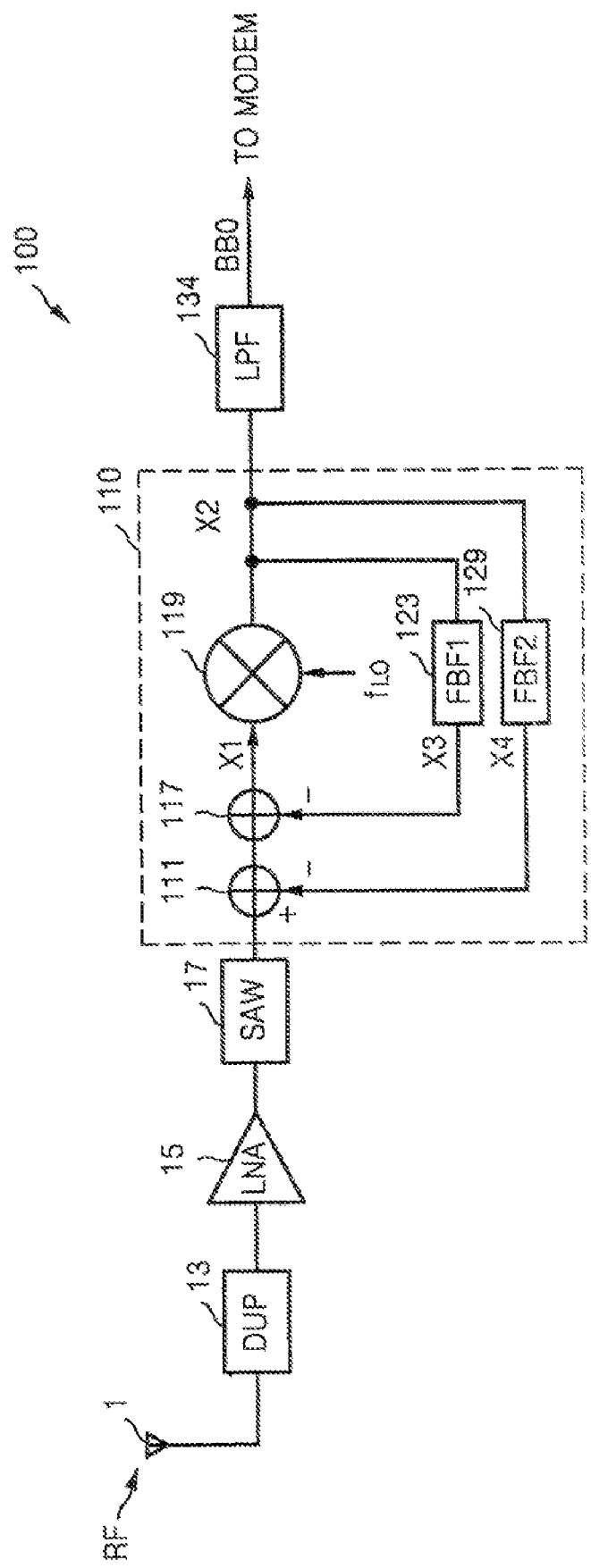
FIG. 3 is a functional block diagram of a wireless communication receiver according to an exemplary embodiment of the present invention.

FIG. 3 is a functional block diagram of a wireless communication receiver 100 according to an exemplary embodiment of the present invention. Referring to FIG. 3, the wireless communication receiver 100 includes an antenna 11, a duplexer 13, a low noise amplifier (LNA) 15, a surface acoustic wave (SAW) filter 17, and a jammer signal removing apparatus 110. The wireless communication receiver 100 may selectively further include a low pass filter (LPF) 134.

The jammer signal removing apparatus 110 includes a first adder 111, a second adder 117, a frequency converter 119, a first filter 123, and a second filter 129. The jammer signal removing apparatus 110 may selectively further include the LPF 134.

Figure 5:
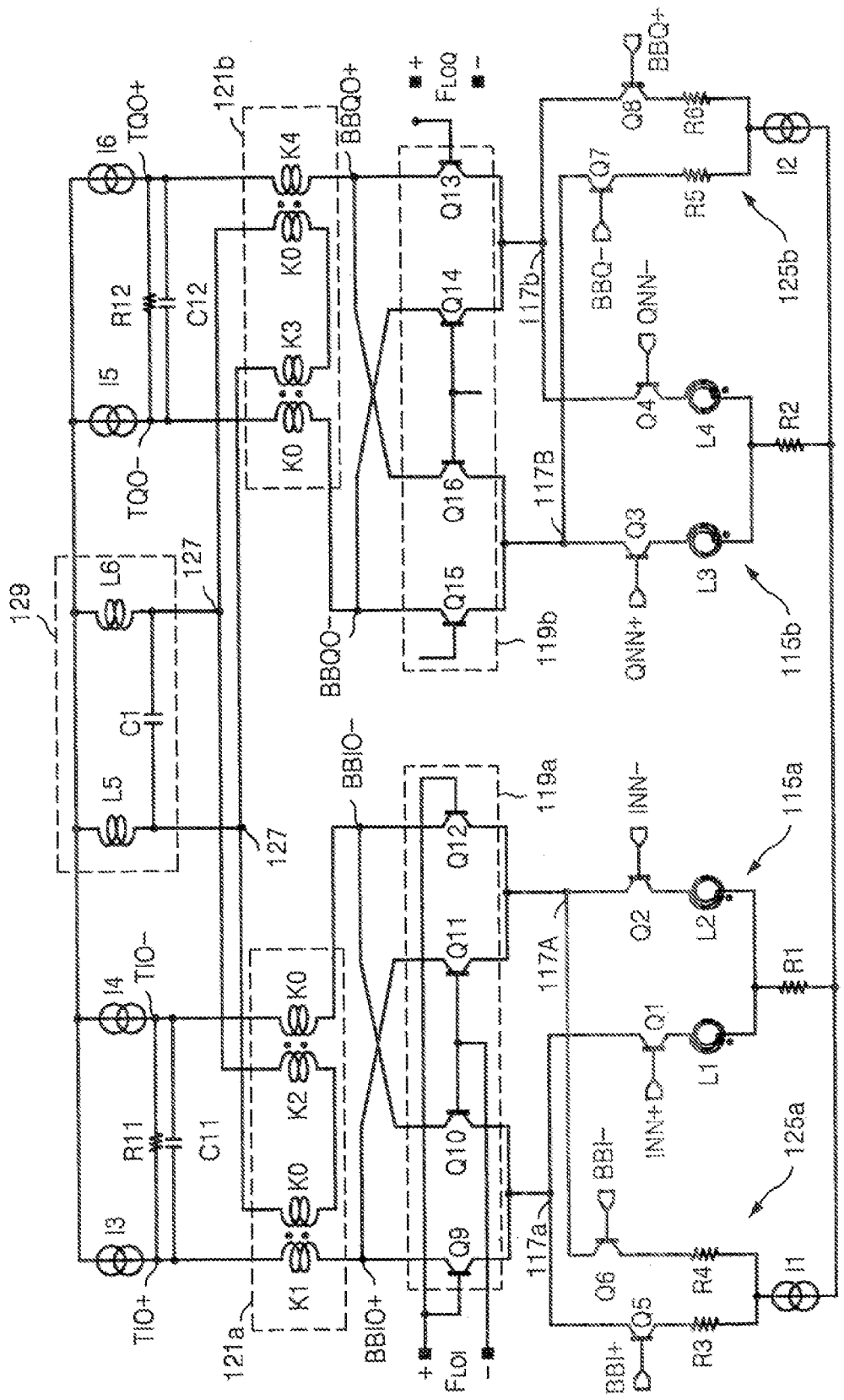
FIG. 5 is a detailed circuit diagram of the jammer signal removing apparatus used in the receiver of FIG. 3.

A first input terminal, that is, a positive input terminal, of the first adder 111 is connected to an output terminal of the SAW filter 17 and a second input terminal, that is, a negative input terminal, of the first adder 111 is connected to an output terminal of the second filter 129. A first input terminal, that is, a positive input terminal, of the second adder 117 is connected to output terminal of the first adder 111 and a second input terminal, that is, a negative input terminal, of the second adder 117 is connected to an output terminal of the first filter 123. At least one of the first and second adders 111 and 117 may be implemented by a wire connection, as illustrated in FIG. 5, but the present invention is not restricted thereto.

Using a local oscillator signal $F_{LO}$, the frequency converter 119 down-converts a radio frequency (RF) signal included in a first signal X1 input via an output terminal of the second adder 117 and up-converts a baseband signal included in the first signal X1 and outputs a baseband signal X2 including both the down-converted signal and the up-converted signal.

The first filter 123 is connected between an output terminal of the frequency converter 119 and the second input terminal of the second adder 117. The first filter 123 may be implemented by a high pass filter or a band pass filter. The first filter 123 removes a desired signal from the baseband signal X2 output via the output terminal of the frequency converter 119 and outputs a jammer signal as a first filter signal X3.

Figure 8A:
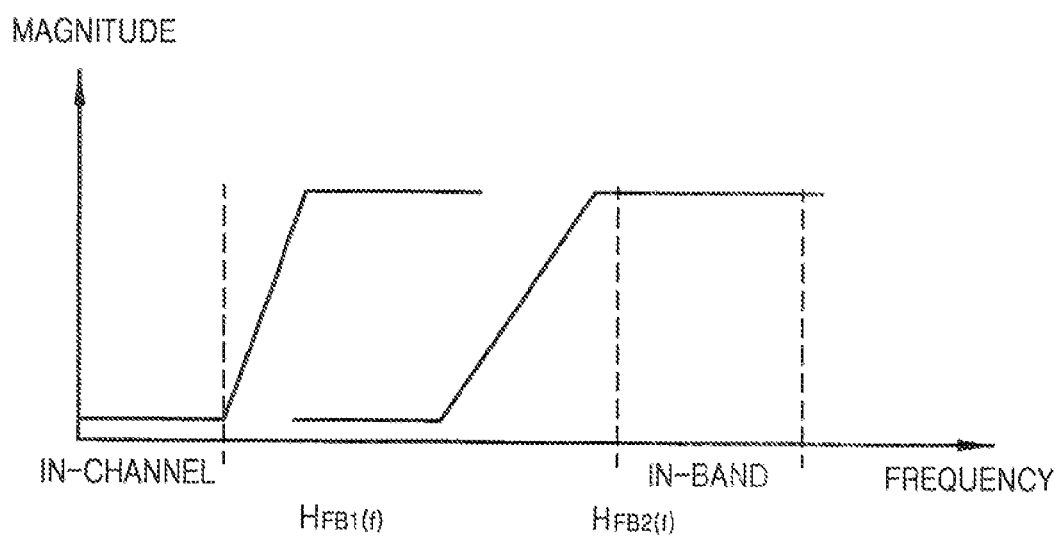
FIGS. 8A and 8B illustrate the cutoff frequencies and bandwidths of a first filter and a second filter illustrated in FIGS. 3 and 7.
Figure 8B:
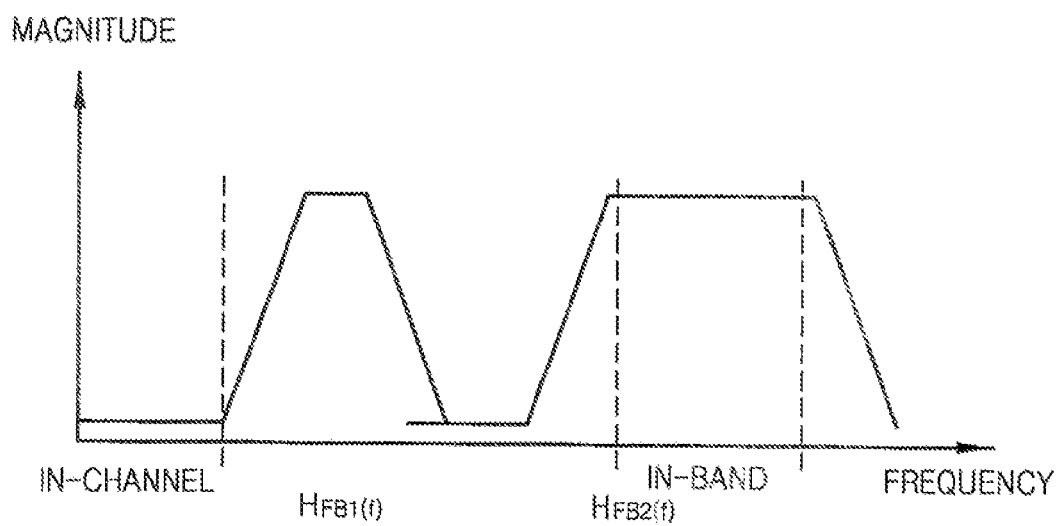

The second filter 129 is connected between the output terminal of the frequency converter 119 and the second input terminal of the first adder 111. The second filter 129 may be implemented by a high pass filter or a band pass filter. The second filter 129 removes a desired signal from the baseband signal X2 output via the output terminal of the frequency converter 119 and outputs an up-converted jammer signal generated by the up-conversion of the frequency converter 119 as a second filter signal X4. As illustrated in FIGS. 8A and 8B, a cutoff frequency of the first filter 123 is lower than that of the second filter 129.

Figure 4:
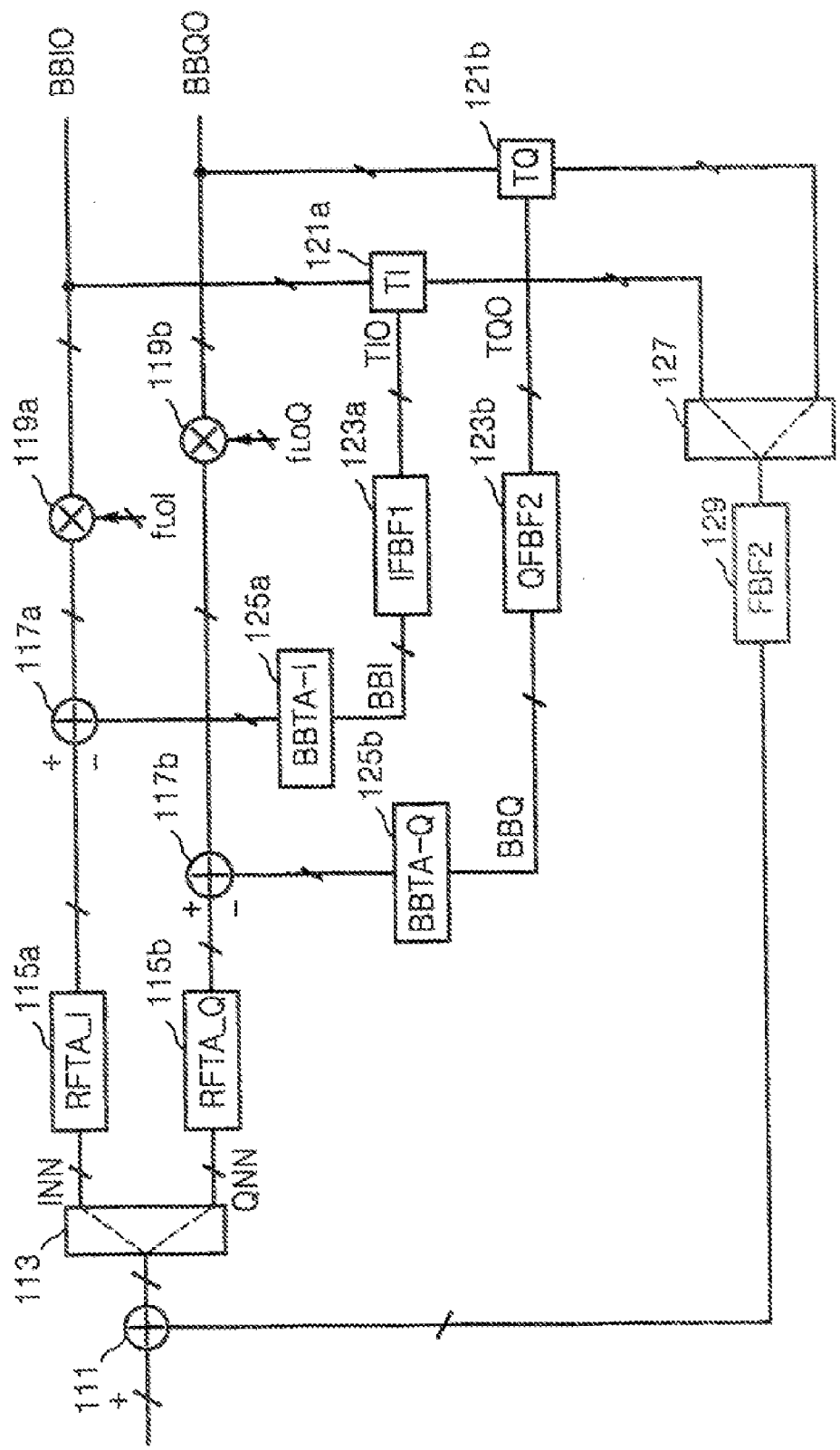
FIG. 4 is a detailed block diagram of a jammer signal removing apparatus used in the receiver of FIG. 3.

FIG. 4 is a block diagram of the jammer signal removing apparatus 110 illustrated in FIG. 3. FIG. 5 is a circuit diagram of the jammer signal removing apparatus 110 illustrated in FIG. 3. Referring to FIGS. 3 through 5, a splitter 113 splits an output signal of the first adder 111 into two identical signals INN and QNN. The splitter 113 may be implemented by an electronic circuit or by a wire connection. A phase difference between the tow RF signal INN and QNN may be 0 degree or 90 degree according to the circuit structure of the splitter 113.

As shown in FIG. 5, a first transconductance amplifier 115a outputs first differential output current signals corresponding to a voltage difference between radio frequency differential input voltage signals INN+ and INN− to a pair of first output terminals 117a and 117A. The first transconductance amplifier 115a may include two transistors Q1 and Q2, two inductors L1 and L2, and a resistor R1.

As shown in FIG. 5, a second transconductance amplifier 115b outputs second differential output current corresponding to a voltage difference between radio frequency differential input voltage signals QNN+ and QNN− to a pair of second output terminals 117b and 117B. The second transconductance amplifier 115b may include two transistors Q3 and Q4, two inductors L3 and L4, and a resistor R2. The phase of the radio frequency differential input voltage signals QNN+ and QNN− input to the second transconductance amplifier 115b and the phase of the radio frequency differential input voltage signals INN+ and INN− input to the first transconductance amplifier 115a may be the same or have a difference of 90 degrees therebetween.

A third transconductance amplifier 125a outputs third differential output current signals corresponding to a voltage difference between in-phase baseband differential input voltage signals BBI+ and BBI−, which are output from a filter 123a, to the pair of first output terminals 117a and 117A. The third transconductance amplifier 125a may include two transistors Q5 and Q6, two resistors R3 and R4, and a current source I1. RF signals and baseband signals simultaneously exist at the pair of first output terminals 117a and 117A.

A fourth transconductance amplifier 125b outputs fourth differential output current signals corresponding to a voltage difference between quadrature-phase baseband differential input voltage signals BBQ+ and BBQ−, which are output from a filter 123b, to the pair of second output terminals 117b and 117B. The fourth transconductance amplifier 125b may include two transistors Q7 and Q8, two resistors R5 and R6, and a current source I2. RF signals and baseband signals simultaneously exist at the pair of second output terminals 117b and 117B.

Each of the first through fourth transconductance amplifier 115a, 115b, 125a, and 125b is an example of a voltage-to-current converter.

The pair of first output terminals 117a and 117A is referred to as the second adder 117 but may be substantially implemented by a wire connection. The present invention, however, is not restricted thereto. Similarly, the pair of second output terminals 117b and 117B is referred to as the second adder 117 but may be substantially implemented by a wire connection but the present invention is not restricted thereto.

As shown in FIG. 5, a first mixer 119a may include a plurality of transistors Q9, Q10, Q11, and Q12. The first mixer 119a down-converts the first differential output current signals via the pair of first output terminals 117a and 117A using in-phase differential local oscillation signals $F_{LOI+}$ and $F_{LOI-}$ and outputs the down-converted first differential signals to a pair of third output terminals as output signals BBI0+ and BBI0−, respectively. Simultaneously, the first mixer 119a up-converts the third differential output current signals via the pair of first output terminals 117a and 117A using the in-phase differential local oscillation signals $F_{LOI+}$ and $F_{LOi-}$ and outputs up-converted second differential signals to the pair of third output terminals. In other words, the first mixer 119a down-converts the first differential output current signals output from the first transconductance amplifier 115a and simultaneously up-converts the third differential output current signals output from the third transconductance amplifier 125a.

A first signal splitting unit 121a splits signals output via the third output terminals into first differential signals and second differential signals; outputs the first differential signals via a pair of fourth output terminals that outputs signals TI0+ and TI0−, respectively; and outputs the second differential signals via a pair of fifth output terminals 127. The first signal splitting unit 121a may include at least one transformer having a predetermined turns ratio.

A second mixer 119b may include a plurality of transistors Q13, Q14, Q15, and Q16. The second mixer 119b down-converts the second differential output current signals via the pair of second output terminals 117b and 117B using quadrature-phase differential local oscillation signals $F_{LOQ+}$ and $F_{LOQ-}$ and outputs the down-converted third differential signals to a pair of sixth output terminals as output signals BBQ0+ and BBQ0−, respectively. Simultaneously, the second mixer 119b up-converts the fourth differential output current signals via the pair of the second output terminals 117b and 117B using the quadrature-phase differential local oscillation signals $F_{LOQ+}$ and $F_{LOQ-}$ and outputs up-converted fourth differential signals to the pair of sixth output terminals. In other words, the second mixer 119b down-converts the second differential output current signals output from the second transconductance amplifier 115b and simultaneously up-converts the fourth differential output current signals output from the fourth transconductance amplifier 125b.

A second signal splitting unit 121b splits signals output via the sixth output terminals into third differential signals and fourth differential signals; outputs the third differential signals via a pair of seventh output terminals that output signals TQ0+ and TQ0−, respectively; and outputs the fourth differential signals via the pair of fifth output terminals 127. The second signal splitting unit 121b may include at least one transformer having a predetermined turns ratio.

A first resistor R11 is connected between the pair of fourth output terminals that respectively output the signals TI0+ and TI0−. Therefore, differential voltages are output due to the operation of the first resistor R11. In an exemplary embodiment of the present invention, a first capacitor C11 may be connected between the pair of fourth output terminals. The first resistor R11 and the first capacitors C11 form a filter having a predetermined response. In exemplary embodiments of the present invention, the filter may function as a low pass filter.

A second resistor R12 is connected between the pair of seventh output terminals that respectively output the signals TI0+ and TI0−. Differential voltages are output due to the operation of the first resistor R12. In an embodiment of the present invention, a second capacitor C12 may be connected between the pair of seventh output terminals. The second resistor R12 and the second capacitors C12 form a filter having a predetermined response. In exemplary embodiments of the present invention, the filter may function as a low pass filter.

The filter 123a receives the signals TI0+ and TI0− output from the first signal splitting unit 121a and passes only a jammer signal in the received signals TI0+ and TI0−. The filter 123b receives the signals TQ0+ and TQ0− output from the second signal splitting unit 121b and passes only a jammer signal in the received signals TQ0+ and TQ−.

Each of the fifth output terminals 127 sums one of the signals output via the first signal splitting unit 121a and one of the signals output via the second signal splitting unit 121b, so that the pair of fifth output terminals 127 generate sum signals, respectively. The pair of fifth output terminals 127 output the sum signals to the second filter 129. Signals output from the second filter 129 are input to the first adder 111. Each of the fifth output terminals 127 may be implemented by a wire connection.

Figure 6A:
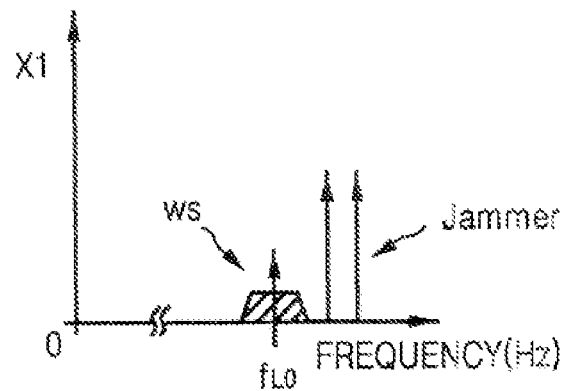
FIGS. 6A through 6H illustrate the waveforms of input/output signals of the jammer signal removing apparatus used in the receiver of FIG. 3.

FIGS. 6A through 6H illustrate waveforms of the input/output signals of the jammer signal removing apparatus 110 illustrated in FIG. 3. The operations of the jammer signal removing apparatus 110 will be described with reference to FIGS. 3 through 6H. Referring to FIGS. 3 and 6A, the input signal X1 of the frequency converter 119 includes a desired signal WS and a jammer signal, which is not desired. The frequency of the jammer signal is higher than that of the wanted desired signal WS.

Figure 6B:
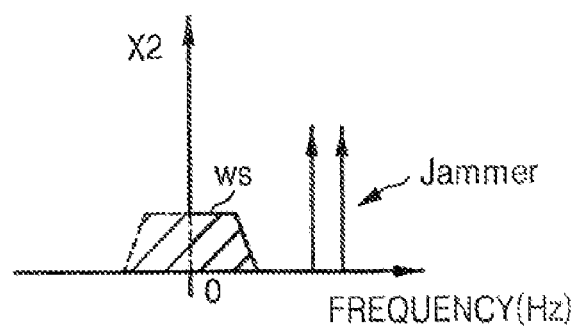

When an input signal X1 passes through the frequency converter 119, the input signal X1 is down-converted into a baseband signal X2. The frequency converter 119 functions as a down-conversion mixer. As illustrated in FIG. 6B, however, the jammer signal still exists in the baseband signal X2.

Figure 6C:
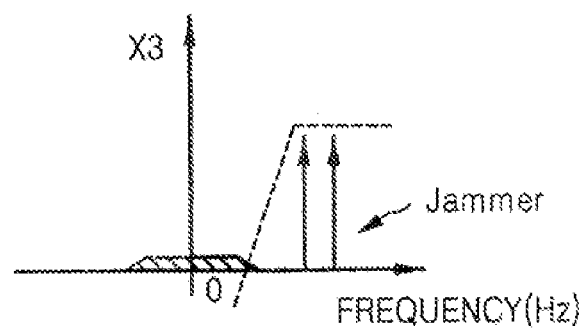

The first filter 123, including the filters 123a an 123b of FIGS. 4 and 5, which may be implemented by a high pass filter or a bond pass filter, receives the baseband signal X2 from the frequency converter 119, including the first and second mixers 119a and 119b. As illustrated in FIG. 6C, the first filter 123 removes the desired signal WS from the baseband signal X2 and outputs the jammer signal as a filtered signal X3.

Figure 6D:
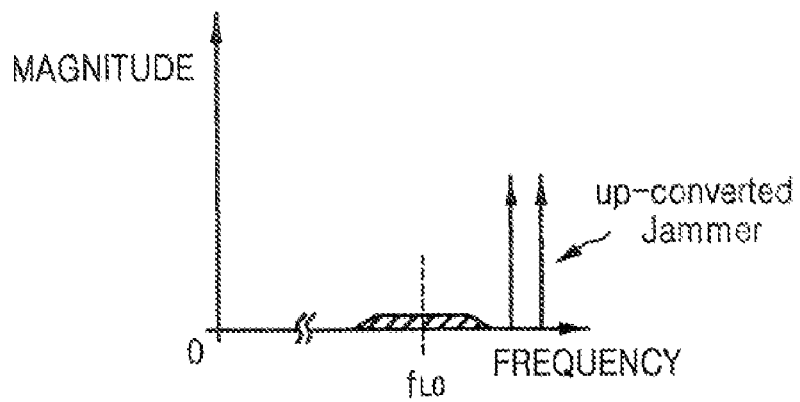

The first mixer 119a receives first differential output current signals, that is, signals generated based on the radio frequency differential input voltage signals INN+ and INN−, and third differential output current signals, that is, signals generated based on the signals BBI+ and BBI− output from the filter 123a, which are output via the pair of first output terminals 117a and 117A. The first mixer 119a down-converts the first differential output current signals, as illustrated in FIG. 6B, and up-converts the third differential output current signals, as illustrated in FIG. 6D.

Figure 6E:
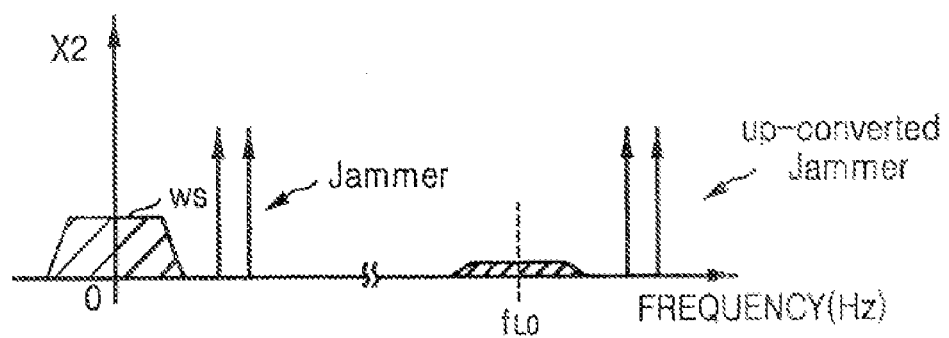

As a result, down-converted first differential output current signals and up-converted third differential output current signals simultaneously exist in output signals of the first mixer 119a, as illustrated in FIG. 6E. In other words, the jammer signal having passed through the filter 123a is up-converted while the jammer signal included in the RF signal is down-converted. The operation of the second mixer 119b is substantially the same as that of the first mixer 119a. Thus, a description thereof will be omitted.

Figure 6F:
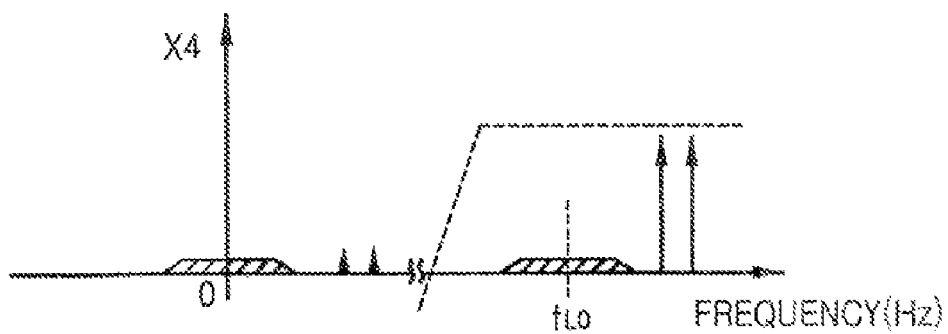

The output signals of the first mixer 119a, which are illustrated in FIG. 6E, are input to the second filter 129. The second filter 129 removes the desired signal WS and outputs the up-converted jammer signal and channel leakage as a filtered signal X4, as illustrated in FIG. 6F.

Figure 6G:
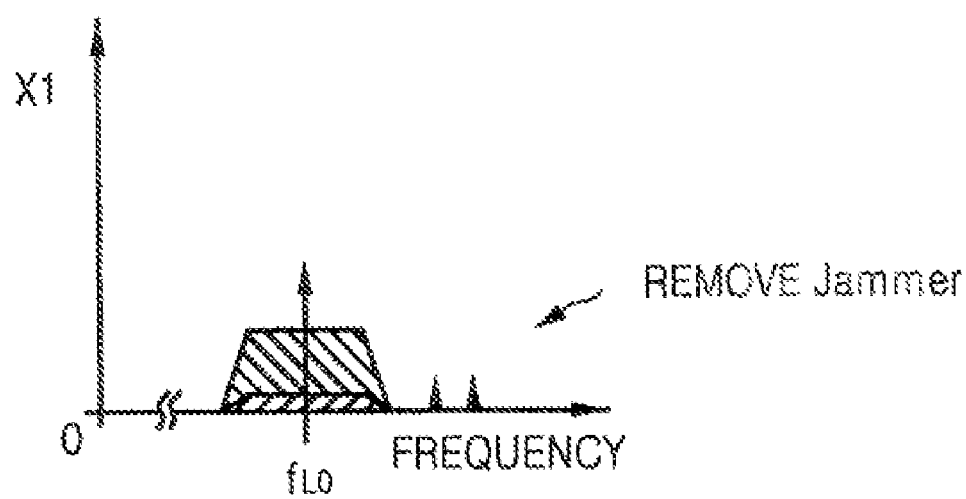
Figure 6H:
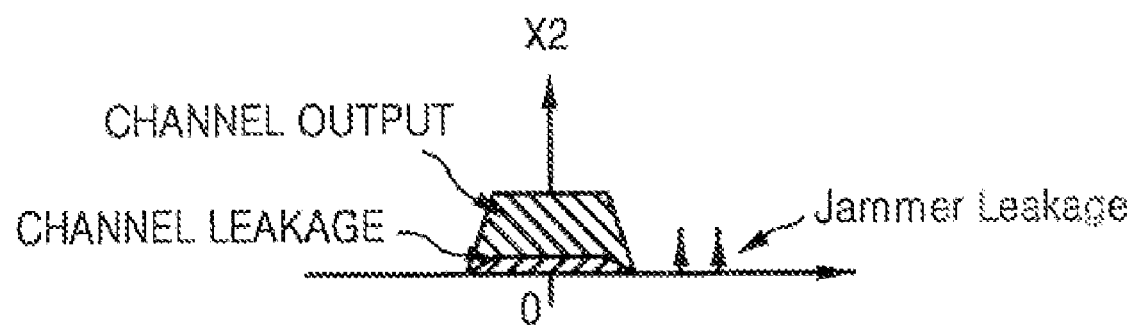

The first adder 111 sums, actually it performs subtraction on, an output signal (see FIG. 6A) of the SAW filter 17, which is input through a positive input terminal, and the output signal X4 (see FIG. 6F) of the second filter 129, which is input through a negative input terminal; and outputs a signal corresponding to a summation result. Accordingly, the input signal X1 of the frequency converter 119 has a waveform as illustrated in FIG. 6G. In other words, the first adder 111 removes the jammer signal from the RF signal that includes both desired signal WS and the jammer signal.

The frequency converter 119 down-converts the input signal X1, from which the jammer signal has been mostly removed, into the baseband signal X2 using the local oscillator signal $f_{LO}$. The frequency converter 119 may also perform image rejection.

Consequently, the jammer signal removing apparatus 110 according to an exemplary embodiment of the present invention can perform channel filtering without using a low pass filter. Because the jammer signal is attenuated before the signal X1 is input to the frequency converter 119, the linearity and the desensitization of a wireless communication receiver using the jammer signal removing apparatus 110 are remarkably improved.

The jammer signal removing apparatus 110 may further include the low pass filter 134. The low pass filter 134 passes only the desired signal WS in the output signal X2 of the frequency converter 119 and removes the jammer leakage, that is, a residual jammer signal, and outputs a filtered signal BB0 to a modem (not shown).

Figure 7:
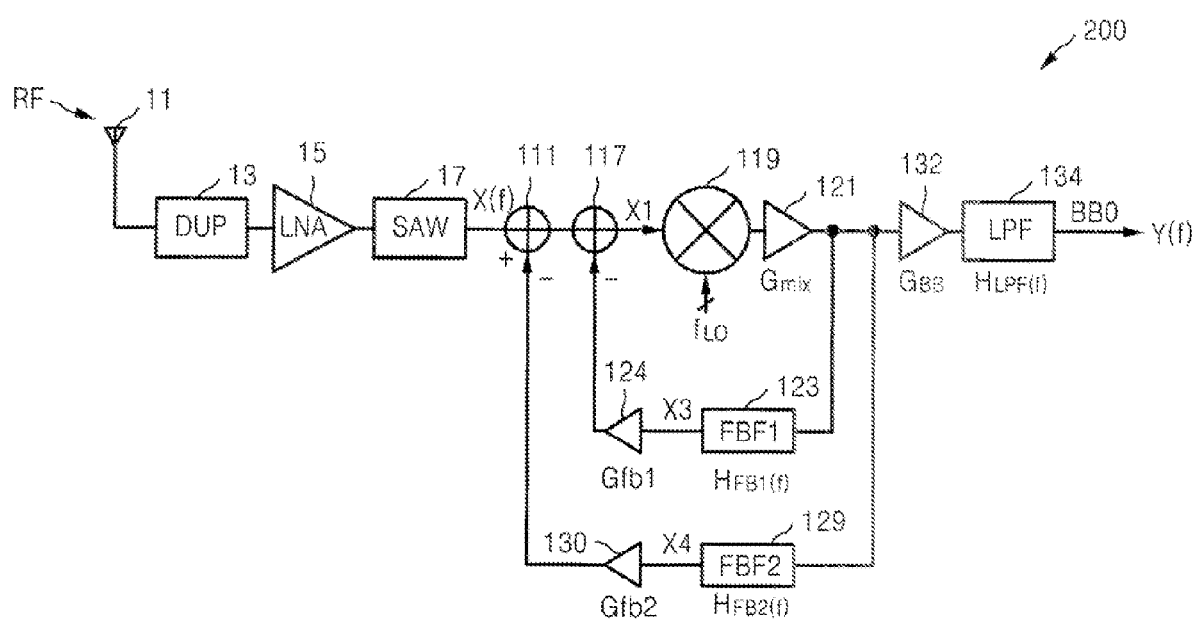
FIG. 7 is a functional block diagram of the wireless communication receiver illustrated in FIG. 3, which is considered in view of a filter.

FIG. 7 is a functional block diagram of a wireless communication receiver 200 according to an exemplary embodiment of the present invention. The wireless communication receiver 200 illustrated in FIG. 7 is the result of reconstructing the elements illustrated in FIG. 3 using a frequency domain function.

A transfer function H(f) of the wireless communication receiver 200 illustrated in FIG. 7 is expected by Equation (1):

$$Y(f) = \frac{G_{mix}G_{BB}H_{LPF(1)}}{1 + G_{mix}(G_{fb1}H_{FB1}(f) + G_{fb2}H_{FB2}(f))} X(f) \quad (1)$$

$$H(f) = \frac{Y(f)}{X(f)} = \frac{G_{mix}G_{BB}H_{LPF(1)}}{1 + G_{mix}(G_{fb1}H_{FB1}(f) + G_{fb2}H_{FB2}(f))}$$

where $G_{mix}$ denotes a gain of an amplifier 121, $G_{BB}$ denotes a gain of an amplifier 132, $G_{fb1}$ denotes a gain of an amplifier 124, and $G_{fb2}$ denotes a gain of an amplifier 130. In exemplary embodiments of the present invention, $G_{mix}$ may denote a gain of the frequency converter 119, $G_{BB}$ may denote a gain of the low pass filter 134, $G_{fb1}$ may denote a gain of the first filter 123, and $G_{fb2}$ may denote a gain of the second filter 129. The gain and the frequency characteristic of each element of the wireless communication receiver 200 can be determined according to requirements using Equation (1).

FIGS. 8A and 8B illustrate the cutoff frequencies and bandwidths of the first filter 123 and the second filter 129 illustrated in FIGS. 3 and 7. Referring to FIGS. 8A and 8B, it will be seen that the cutoff frequency of the first filter 123 is lower than that of the second filter 129.

As described above, an apparatus for removing a jammer signal according to exemplary embodiments of the present invention can effectively reduce an interferer signal, that is, a jammer signal in an RF signal input to a frequency converter included in a wireless communication system. When a wireless communication system uses the exemplary embodiments of the present invention, linearity and desensitization are remarkably improved.

While the present invention has been particularly shown and described with reference to exemplary embodiments thereof, it will be understood by those of ordinary skill in the art that various changes in form and details may be made therein without departing from the spirit and scope of the present invention, as defined by the following claims.

What is claimed is:

1. A frequency converter comprising:

a first transconductance amplifier outputting first differential output current signals, corresponding to a voltage difference between radio frequency differential input voltage signals, to a pair of first output terminals;

a second transconductance amplifier outputting second differential output current signals, corresponding to the voltage difference between the radio frequency differential input voltage signals, to a pair of second output terminals;

a third transconductance amplifier outputting third differential output current signals, corresponding to a voltage difference between in-phase baseband differential input voltage signals, to a pair of first output terminals;

a fourth transconductance amplifier outputting fourth differential output current signals, corresponding to a voltage difference between quadrature-phase baseband differential input voltage signals, to a pair of second output terminals;

a first mixer down-converting the first differential output current signals in response to in-phase differential local oscillation signals and outputting down-converted first differential signals to a pair of third output terminals, and simultaneously up-converting the third differential output current signals in response to the in-phase differential local oscillation signals and outputting up-converted second differential signals to the pair of third output terminals;

a first signal splitting unit splitting signals output via the pair of third output terminals into the first differential signals and the second differential signals, outputting the first differential signals via a pair of fourth output terminals, and outputting the second differential signals via a pair of fifth output terminals;

a second mixer down-converting the second differential output current signals using quadrature-phase differential local oscillation signals and outputting down-converted third differential signals to a pair of sixth output terminals, and simultaneously up-converting the fourth differential output current signals using the quadrature-phase differential local oscillation signals and outputting up-converted fourth differential signals to the pair of sixth output terminals; and a second signal splitting unit splitting signals output via the pair of sixth output terminals into the third differential signals and the fourth differential signals, outputting the third differential signals via a pair of seventh output terminals, not outputting the fourth differential signals via the pair of fifth output terminals.

2. The frequency converter of claim 1, further comprising:

a first resistor connected between the pair of fourth output terminals; and a second resistor connected between the pair of seventh output terminals.

3. The frequency converter of claim 1, wherein each of the first and second signal splitting units comprises a transformer.

4. An apparatus for removing a jammer signal in a wireless communication receiver, the apparatus comprising:

a first adder having a first input terminal for receiving a radio frequency signal including a first signal and a jammer signal and having a second input terminal;

a second adder having a first input terminal for receiving a radio frequency signal output from the first adder and having a second input terminal;

a frequency converter down-converting a radio frequency signal included in a second signal output from the second adder and up-converting a baseband signal included in the second signal using a local oscillator signal;

a first filter connected between an output terminal of the frequency converter and the second input terminal of the first adder for removing the first signal; and a second filter connected between the output terminal of the frequency converter and the second input terminal of the second adder for removing the first signal.

5. The apparatus of claim 4, wherein a cutoff frequency of the first filter is lower than a cutoff frequency of the second filter.

6. The apparatus of claim 4, wherein the frequency converter up-converts a jammer signal that has passed through the first filter.

7. The apparatus of claim 4, wherein each of the first and second filters comprises one of a high pass filter and a band pass filter.

8. The apparatus of claim 4, further comprising a low pass filter outputting only the first signal in an output signal of the frequency converter.

9. A wireless communication receiver comprising:

an antenna receiving a radio frequency signal including a first signal and a jammer signal;

a first adder having a first input terminal for receiving the radio frequency signal and having a second input terminal;

a second adder having a first input terminal for receiving a radio frequency signal output from the first adder and having a second input terminal;

a frequency converter down-converting a radio frequency signal included in a second signal output from the second adder and up-converting a baseband signal included in the second signal using a local oscillator signal;

a first filter connected between an output terminal of the frequency converter and the second input terminal of the first adder to output a jammer signal that has been down-converted by the frequency converter as a first filter signal; and a second filter connected between the output terminal of the frequency converter and the second input terminals of the second adder to output a jammer signal that has been up-converted by the frequency converter as a second filter signal.

10. The wireless communication receiver of claim 9, wherein the first adder removes the up-converted jammer signal using the radio frequency signal received through the first input terminal and the second filter signal received through the second input terminal.

11. The wireless communication receiver of claim 9, wherein a cutoff frequency of the first filter is lower than a cutoff frequency of the second filter.

12. A method of removing a jammer signal in a wireless communication receiver, the method comprising:

down-converting a first signal and a jammer signal, which are included in a radio frequency signal, using a frequency converter;

outputting the jammer signal as a first filter signal using a first filter;

up-converting the first filter signal output from the first filter using the frequency converter;

outputting the up-converted jammer signal as a second filter signal using a second filter having a higher cutoff frequency than the first filter; and receiving the radio frequency signal and the second filter signal and removing the jammer signal using the radio frequency signal and the second filter signal.

* * * * *